United States Patent [19]
Schutter et al.

[11] Patent Number: 5,527,008
[45] Date of Patent: Jun. 18, 1996

[54] CONTAINER HOLDER

[75] Inventors: Paul C. Schutter, Kent City; Kelly A. Lancaster, Wyoming; Gregory M. Ejsmont, Grand Rapids, all of Mich.

[73] Assignee: Lescoa, Inc., Kentwood, Mich.

[21] Appl. No.: 179,988

[22] Filed: Jan. 11, 1994

[51] Int. Cl.⁶ ...................................................... A47K 1/00
[52] U.S. Cl. ..................... 248/311.2; 224/926; 248/285.1
[58] Field of Search ................................. 248/311.2, 293, 248/284, 298, 285, 291.1, 284.1, 298.1, 285.1, 292.13; 297/188.01, 188.14, 188.19; 224/281, 42.44, 273, 926

[56] References Cited

U.S. PATENT DOCUMENTS

| | | |
|---|---|---|
| 2,546,459 | 3/1951 | Lee . |
| 2,634,181 | 4/1953 | Hunt . |
| 2,654,616 | 10/1953 | Mockli . |
| 2,772,934 | 12/1956 | Eraut . |
| 2,825,611 | 3/1958 | Aynesworth . |
| 2,845,315 | 7/1958 | McCoy . |
| 2,897,974 | 8/1959 | Cook ..................................... 248/346 X |
| 3,039,616 | 6/1962 | Proffit . |
| 3,190,241 | 6/1965 | Rodgers et al. . |
| 3,606,112 | 9/1971 | Cheshier . |
| 3,637,184 | 1/1972 | O'Brien . |
| 3,859,931 | 1/1975 | Lalonde . |
| 3,899,982 | 8/1975 | Fetzek . |
| 4,087,126 | 5/1978 | Wynn . |
| 4,286,742 | 9/1981 | Pellegrino . |
| 4,417,764 | 11/1983 | Marcus et al. . |
| 4,511,072 | 4/1985 | Owens . |
| 4,530,480 | 7/1985 | Pratt . |
| 4,645,157 | 2/1987 | Parker . |
| 4,728,018 | 3/1988 | Parker . |
| 4,733,900 | 3/1988 | Fluharty . |
| 4,733,908 | 3/1988 | Dykstra et al. . |
| 4,738,423 | 4/1988 | DiFilippo et al. . |
| 4,756,572 | 7/1988 | Dykstra et al. . |
| 4,759,584 | 7/1988 | Dykstra et al. . |
| 4,783,037 | 11/1988 | Flowerday . |
| 4,792,174 | 12/1988 | Shioda . |
| 4,792,184 | 12/1988 | Lindberg et al. . |
| 4,818,017 | 4/1989 | Dykstra et al. . |
| 4,819,843 | 4/1989 | Nakayama . |
| 4,826,058 | 5/1989 | Nakayama . |
| 4,828,211 | 5/1989 | McConnell et al. . |
| 4,854,536 | 8/1989 | Lorence et al. . |
| 4,892,281 | 1/1990 | DiFilippo et al. . |
| 4,943,111 | 7/1990 | VanderLaan . |
| 4,953,771 | 9/1990 | Fischer et al. . |
| 4,955,571 | 9/1990 | Lorence et al. . |
| 4,981,277 | 1/1991 | Elwell ................................. 248/311.2 |
| 5,018,633 | 5/1991 | Toth et al. . |
| 5,024,411 | 6/1991 | Elwell ................................. 248/311.2 |
| 5,104,184 | 4/1992 | Kwasnik et al. . |
| 5,131,716 | 7/1992 | Kwasnik et al. . |
| 5,171,061 | 12/1992 | Marcusen . |
| 5,190,259 | 3/1993 | Okazaki . |
| 5,259,580 | 11/1993 | Anderson et al. . |
| 5,280,870 | 1/1994 | Chick et al. ......................... 248/311.2 |
| 5,284,314 | 2/1994 | Misaras et al. ...................... 248/311.2 |
| 5,330,146 | 7/1994 | Spykerman .................... 297/188.17 X |

*Primary Examiner*—Karen J. Chotkowski
*Attorney, Agent, or Firm*—Varnum, Riddering, Schmidt & Howlett

[57] ABSTRACT

The invention is directed to a cupholder comprising a drawer slidably mounted within a housing for movement between a stored position and a use position. The drawer has a semi-circular recess in combination with an arm to form a cup retaining area. The arm is biased away from the drawer. In the stored position, the drawer is retained within the housing and the arm abuts the interior of the housing. In the use position, the arm is biased away from the drawer to its outermost position to form the largest size cup retaining area. The arm can be pivoted inward toward the drawer and locked in discrete positions by a ratchet to form cup retaining areas of decreasing size to accommodate different size containers. Once the arm is pivoted beyond the smallest size cup retaining area, the arm is automatically biased outwardly to its outermost position.

25 Claims, 6 Drawing Sheets

5,527,008

CONTAINER HOLDER

BACKGROUND OF THE INVENTION

1. Field of the Invention

This invention relates to a container holder, and more specifically to an adjustable container holder for receiving containers of varying sizes.

2. Description of Related Art

Container holders in an automobile are commonplace in contemporary vehicles. The container holders are used to store a beverage container so that the vehicle operator can operate the vehicle without concern over the spilling of the container. Consequently, a number of devices have been developed for retaining and supporting beverage containers used in automobiles.

Several prior patents disclose trays which may be slidably mounted below an automobile dashboard for movement between a retracted storage position below the dashboard and an extended position of use above or close to the leading edge of the front passenger seat. Such trays may be provided with fixed circular apertures for receiving beverage containers. Examples of these devices are disclosed in U.S. Pat. No. 2,825,611, issued Mar. 4, 1958, U.S. Pat. No. 3,606,112, issued Sept. 20, 1971, and U.S. Pat. No. 3,899,982, issued Aug. 19, 1975.

Other references disclose trays which may be swingably mounted below an automobile dashboard for movement between a storage position below the dashboard and position of use extending from the dashboard toward the seat. These trays also may be provided with fixed circular apertures for receiving beverage containers. Examples of the latter devices are disclosed in U.S. Pat. No. 3,772,934, issued Dec. 4, 1956, and U.S. Pat. No. 3,190,241, issued Jun. 22, 1965.

These prior art devices which provide specific means for supporting and retaining beverage containers disclose trays having complete and fixed circular apertures arranged in a side-by-side or front-to-back relation. This necessarily requires that the width or depth, respectively, of the tray be greater than the diameter of two beverage containers to allow enough area to enclose a pair of fixed, complete circular apertures. Such devices obviously occupy considerable space below the vehicle dashboard.

More recent container holders disclose a drawer or tray slidably mounted within the dashboard or console of the vehicle. The drawer or tray has semicircular openings forming a portion of a cup receiving area and arcuate arms completing the cup receiving area. Many of these container holders disclose arms which are biased inwardly toward the drawer and which can be moved outwardly from an initial minimum position to an enlarged position to receive a cup of larger diameter than the cup receiving area. Examples of these cup holders are U.S. Pat. No. 5,259,580, issued Nov. 9, 1993 and U.S. Pat. No. 4,953,771, issued Sep. 4, 1990.

Similarly, other cup holders have a cup receiving area formed by a body portion having semicircular openings and an arm which is biased to a closed or retracted position. These cup holders are expandable from a minimum size to a larger size by forcing the cup into the cup receiving area and moving the arm opposite the direction that it is biased. See U.S. Pat. No. 5,131,716, issued Jul. 21, 1992, U.S. Pat. No. 5,104,184, issued Apr. 14, 1992, and U.S. Pat. No. 5,190,259, issued Mar. 2, 1993. However, these cup holders are difficult and unsafe to use because they often require the use of both hands when the cup is larger than the minimum cup holder size. One hand is used to expand the cup holder and the other hand is used to place the cup in the expanded cup holder.

The invention improves the art of adjustable cup holders by providing a container holder having variable size container holders that can be easily adjusted with one hand between multiple discrete positions and remain fixed in the desired position. Thus, the vehicle operator only needs one hand to operate the container holder.

SUMMARY OF INVENTION

The invention is a container holder for supporting a container. The container holder comprises a housing having a back and a front. A drawer is slidably mounted within the housing. The drawer is slidable between a stored position and use position. The drawer has a recess that is disposed within the housing when the drawer is in the stored position and extends beyond the front of the housing when the drawer is in the use position. An arm is movably mounted to the drawer adjacent to the recess to define a container receiving area between the recess and the arm. The container receiving area is of varying size. A first positioning member is mounted to one of the arm and the drawer and the second positioning member is mounted to the other of the arm and the drawer and is engagable with the first positioning member. The second positioning member is releasably engagable with the first positioning member to releasably retain the arm in a plurality of adjusted positions with respect to the recess so that the container receiving area can be releasably set in different sizes to accommodate different size containers.

Preferably, the container holder further comprises a second recess and a second arm movably mounted to the drawer in complementary relationship to the second recess to define a second container receiving area of varying size. The housing can have opposed sidewalls, each with a groove, in combination with the drawer having opposed sidewalls, each with a rail, so that the rails of the drawer can be slidably mounted in the grooves of the housing.

The first and second positioning members can be a pin and teeth and a pawl and ratchet with multiple detents. The arm is preferably pivotally mounted to the drawer by a pivot pin for rotation about a vertical axis. A biasing member biases the arm outwardly of the drawer. The arm can be arcuate in shape and have a container platform for supporting the base of a container received within the container receiving area. The container holder can also have a release for the first and second position members to permit movement of the arm from the retracted position from the outermost position without interference between the first and second positioning members. The housing can have a sidewall that interfaces with the arm to move the arm to the retracted position when the drawer is in the stored position, whereby the arm will automatically move to the outermost position when the drawer is moved to the use position.

In another aspect of the invention, the container holder comprising a housing having a back and front. A drawer is slidably mounted within the housing and is slidably between the stored position and a use position. The drawer has a back which is adjacent the back of the housing when the drawer is in the stored position. An adjustable retainer is movably mounted to the drawer and defines a container receiving area of varying size that is discretely adjustable so that the size of the container receiving area is adjustable to accommodate containers of varying size. A release releasably retains the adjustable retainer in a plurality of adjusted positions with respect to the drawer so that the container receiving area can be releasably set in different sizes.

In yet another aspect of the invention, a container holder for supporting a container comprises a housing having a back and a front. A drawer is slidably mounted within the housing and has a recess. The drawer is slidable between a stored position where the recess is disposed within the housing and a use position where the recess extends beyond the front of the housing. An arm is mounted to the drawer and is complementary with the recess. The arm moves between a retracted position within the recess to an outermost position so that the recess and the arm define a container receiving area. A compartment is disposed in the drawer and receives personal items.

Preferably, the compartment further comprises a plurality of pockets for receiving coins. Also, the container holder can further comprise a second compartment for receiving waste material.

BRIEF DESCRIPTION OF THE DRAWINGS

The invention will now be described with reference to the drawings wherein.

DESCRIPTION OF THE PREFERRED EMBODIMENT

Figure 1:
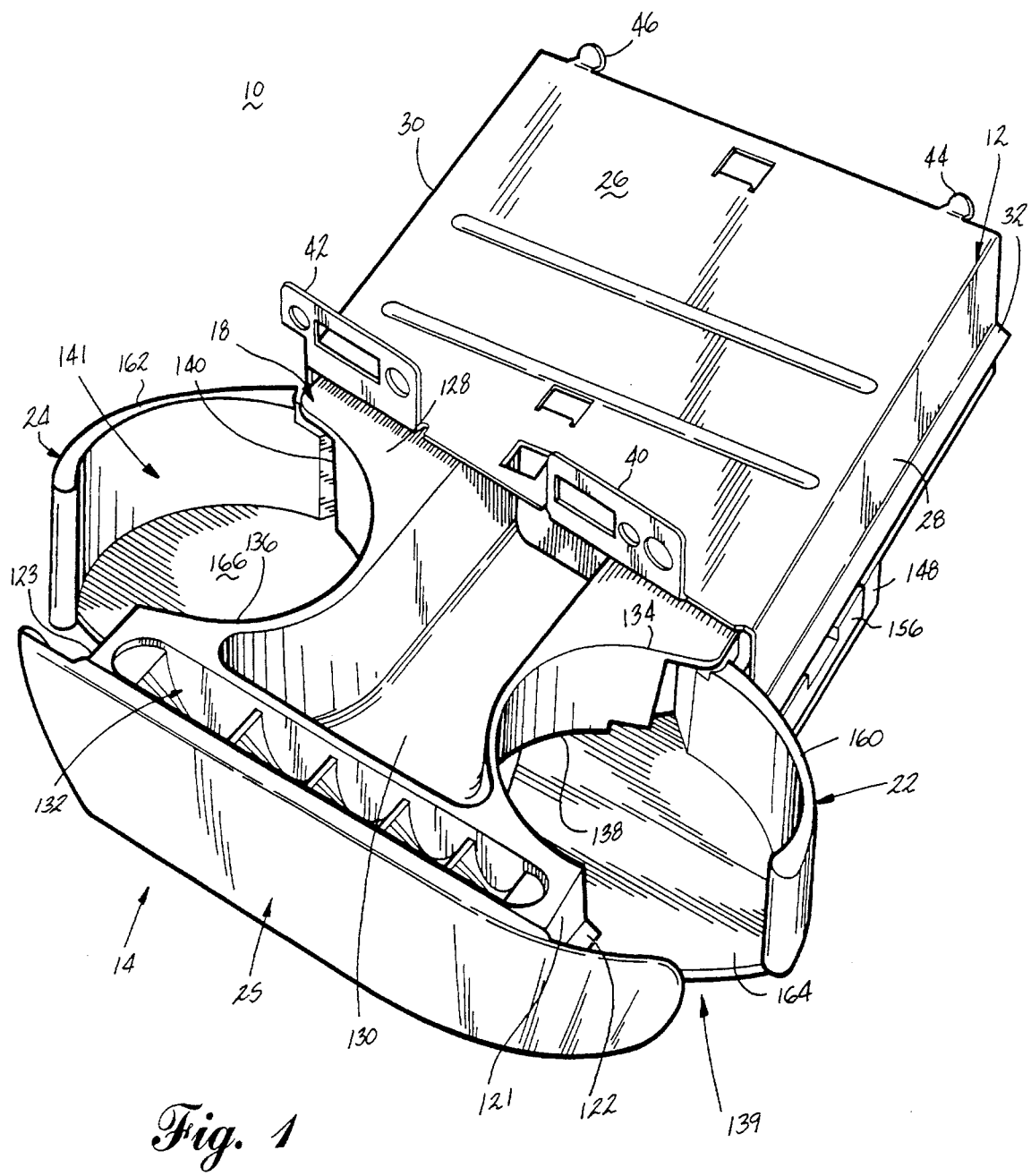
FIG. 1 is a perspective view of the container holder according to the invention in the use position.
Figure 2:
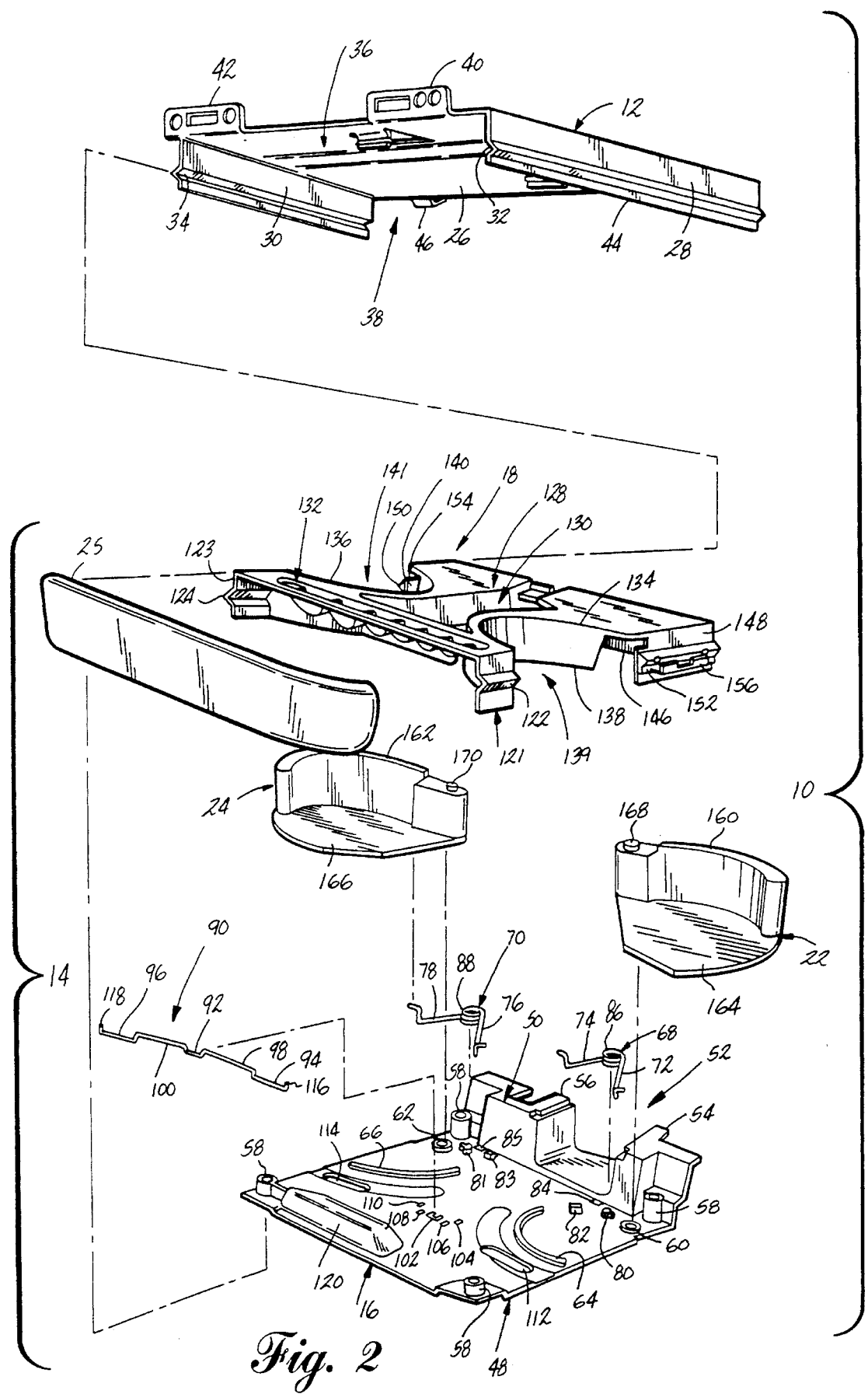
FIG. 2 is an exploded view of the container holder of FIG. 1.

Referring now to the drawings and to FIGS. 1 and 2 in particular, FIGS. 1 and 2 illustrate the container holder 10 according to the invention. The container holder 10 comprises housing 12 in which a drawer 14 is slidably mounted. The drawer 14 comprises base 16, tray 18, decorative face plate 25 and opposed arms 22 and 24.

The housing 12 is preferably formed from a suitable metal and bent to define a top wall 26 and sidewalls 28 and 30. Each sidewall 28 and 30 has grooves 32 and 34, respectively. The housing 12 can also be molded from a suitable plastic. The top wall 26 and sidewalls 28 and 30 of the housing define a front opening 36 and a back opening 38. The drawer 14 is slidably mounted within the housing so that the drawer 14 is slidably moved from the back opening 38 to the front opening 36 between a stored position and a use position (FIG. 1).

Mounting brackets 40 and 42 extend upwardly from the top wall 26 of the housing 12. Tabs 44 and 46 extend outwardly from the top wall 26 near the back opening 38. The brackets 40 and 42 and tabs 44 and 46 are used to mount the housing 12 to a portion of the vehicle. Preferably, the housing 12 is mounted within a recess (not shown) in the dashboard of the vehicle. The housing 12 can also be mounted under the seat of the vehicle, in an armrest or any other suitable location within the vehicle.

Referring to FIGS. 1–3 and 5, the base 16 of the drawer 14 comprises a platform 48 from which extends upwardly a rear wall 50 having a U-shaped opening 52 defined by rearwardly extending flanges 54 and 56. The platform 48 has tubular bosses 58 disposed at each corner for mounting the tray 18. Pivot pin mounts 60 and 62 pivotally mount arms 22 and 24, respectively, to the platform 48. The arms 22 and 24 are supported by arm guides 64 and 66, respectively, extending upwardly from the platform 48. Arm springs 68 and 70 have legs 72, 74 and 76, 78, respectively and a central coil 86, 88. The arm springs 68 and 70 are mounted to the platform 48 so the arms 22, 24 are biased outwardly of the platform 48. Preferably, the base is molded from a suitable plastic.

Arm springs 68 and 70 both mount to the platform 48 in an identical manner. The central coils 86, 88 of the arm springs 68, 70 are slidably mounted onto the spring pins 80, 81 protruding upward from the platform 48. The legs 74, 76 are disposed under hook-shaped protrusions 82, 83 extending upwardly from the platform 48 and abut against stops 84, 85 to secure the arm springs to the platform 48. The other legs 72, 78 abut the arms 22, 24 to bias the arm outwardly of the platform 48.

A locking spring 90 having a U-shaped central portion 92 and U-shaped end portions 94 and 96 connected to the U-shaped central portion 92 by straight portions 98 and 100 is mounted to the platform 48 and locks the arms 22 and 24 in discrete positions. The outermost ends of the locking spring 90 have pins or pawls 116 and 118, respectively. The spring 90 and pawls 116 and 118 help position the arms 22 and 24 with respect to the drawer.

The locking spring 90 is mounted to the platform 48 by inserting the U-shaped central portion about a flange 102 formed in the platform 48 and abutting the straight portions 98 and 100 between opposed pairs of stops 104, 106 and 108, 110, respectively. By mounting the locking spring 90 in this manner, the U-shaped end portions 94 and 96 are disposed within openings 112 and 114 formed in the platform 48 with the pawls 116 and 118 of the locking spring directed upwardly and extending beyond the upper surface of the platform 48, but below the arm guides 64 and 66. The platform 48 can also be formed with a recess 120 that defines an area for receiving the fingers of a user of the container holder 10 to aid the user in sliding the drawer 14 within the housing 12.

Referring to FIGS. 1 and 2, the tray 18 is preferably molded from a suitable plastic and comprises an upper surface 128 having a first and second compartment 130 and 132 formed therein. Preferably, the first compartment 130 is a recess suitable for use as a storage for personal items. The second compartment 132 is suitable for storing coins and can be subdivided into multiple compartments each for the storage of different size coins. The upper surface 128 has two semicircular recesses 134 and 136 with downwardly directed sidewalls 138 and 140, respectively. The semicircular recesses form a portion of cup receiving areas 139, 141, respectively. The arms 22 and 24 form the other portion of the cup receiving areas 139 and 141.

The tray 18 has front sidewalls 121 and 123 with guide rails 122 and 124 formed therein and slidable within the grooves 32 and 34 when the container holder 10 is assembled and the drawer 14 is in the stored position. The tray 18 also has rear wall 146 connecting rear sidewalls 148 and 150. Rails 152 and 154 are mounted to the sidewalls 148 and 150, respectively, by rivets. Rails 152 and 154 are complementary to guide rails 122 and 124. Each rail 152 and 154 is formed with a lip for retaining the sidewalls 28 and 30 of the housing 12 when the container holder 10 is assembled and the rails 152 and 154 are inserted into the grooves 32 and 34. The rail 152 has a lip 156. The rail 154 has a similar lip (not shown).

The arms 22 and 24 comprise an arcuate portion 160 and 162 from which extend a container platform 164 and 166. One end of the arm portions 160 and 162 have pivot pins 168 and 170. One end of pivot pins 168 and 170 is inserted into the pivot pin mounts 62 and 60 of the platform 48 to pivotally mount the arms 22 and 24 to the platform 48. The other end of the pivot pins 168, 170 are inserted into pivot pin mounts (not shown) on the underside of the surface 128 to pivotally mount the arms 22 and 24 to the tray 18.

Figures 4, 8:
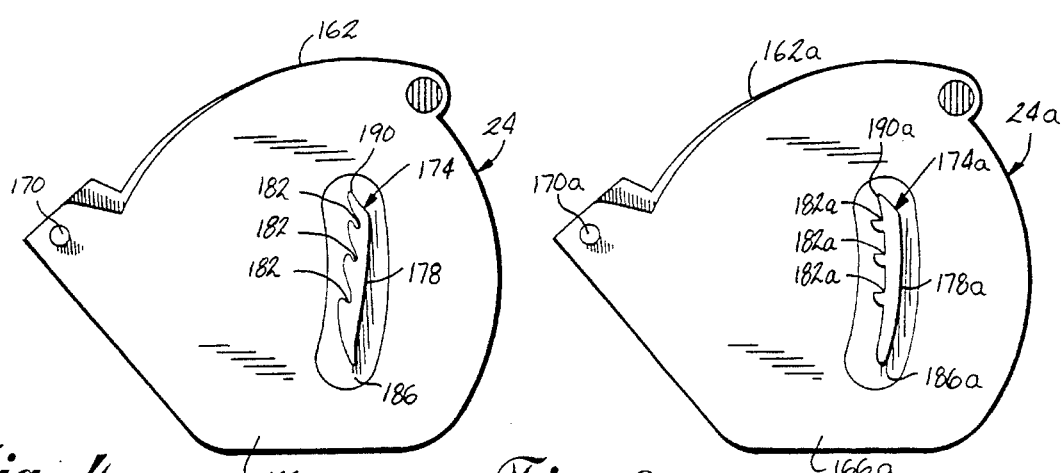
FIG. 4 is a bottom view of one of the arms of the container holder of FIG. 1.
FIG. 8 is a bottom view of one of the arms of the container holder like FIG. 4 but illustrating a pin and tube rachet mechanism.
Figure 5:
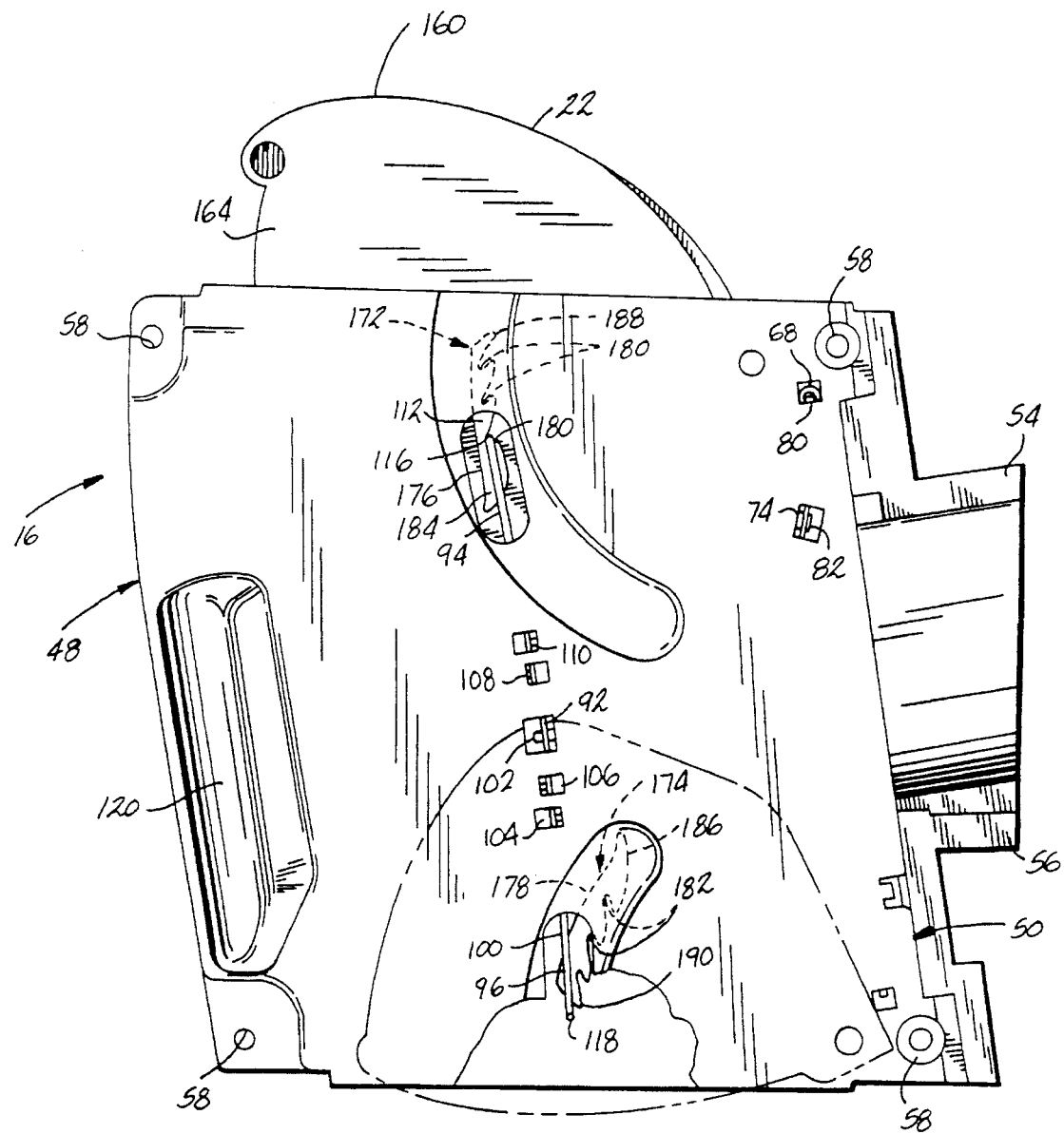
FIG. 5 is a bottom view of the assembled container holder of FIG. 1.

Referring to FIGS. 4 and 5, positioning members or ratchets 172 and 174 are disposed on the lower surface of container platforms 164 and 166. The ratchets 172 and 174 are substantially mirror images of each other and only one ratchet will be described in detail. The ratchet 172 has a top edge 176 opposite multiple detents 180. When the drawer 14 is in the stored position, the pawl 116 is adjacent the top edge 176 of ratchet 172. The pawl 116 engages the detents 180 when the arms are pivoted inwardly and the drawer 14 is in the use position. The ratchet 172 has leading edge 184 and trailing edge 188. In like manner, the ratchet 174 has a top edge 178 and multiple detents 182. The ratchet 174 further has a leading edge 186 and a trailing edge 190. When the drawer 14 is in the stored position, the pawl 118 is adjacent the top edge 178 of the ratchet 174. The pawl 118 engages the detents 182 when the arms are pivoted inwardly and the drawer 14 is in the use position.

To assemble the container holder 10, the arm spring 68 and 70 and the locking spring 90 are mounted to the platform 48 as previously described. The arms 22 and 24 are pivotally mounted to the base 16 and the tray 18 by inserting the pivot pins 168 and 170 into the pivot pin mounts 60 and 62 of the platform 48 so that the legs 72 and 78 of arm springs 68 and 70 abut the container platform 164 and 166 of the arms 24 and 22. In this position, the container platforms 164 and 166 rest on the arm guides 64 and 66.

The tray 18 is placed onto the base 16 and screws (not shown) are inserted through the tubular bosses 58 and threaded into corresponding bosses (not shown) on the underside of surface 128 of the tray 18. The pivot pins 168 and 170 are inserted into pivot pin mounts 60 and 62 on the underside of the tray 18. The tray 18 is mounted to the base 16 so the container platforms 164 and 166 can slide between the arm guides 64 and 66 and the sidewalls 138 and 140 of the semicircular recesses 134 and 136. The decorative face plate 25 is mounted to the tray 18, preferably by screws (not shown).

Once the drawer 14 is assembled, the drawer 14 is slidably mounted within the housing 12 by inserting the guide rails 122, 124 and rails 152, 154 into the grooves 32 and 34 so that the lips 156 and 158 encompass the lower portion of the sidewalls 28 and 30.

In operation, the drawer 14 is initially retained within the housing 12 so that the rear wall 146 is disposed adjacent the back opening 38 of the housing 12 in the stored position where the arms 22 and 24 are biased against the sidewalls 28 and 30 of the housing 12. To move the drawer 14 from the stored position to the use position, the operator of the vehicle grasps the drawer 14, preferably by inserting the user's fingers within the recess 120 of the base 16 and pulling outward on the drawer 14. As the arms 22 and 24 clear the sidewalls 28, 30 of the housing 12, the springs 68 and 70 bias the arms outwardly and pivot the arms 22 and 24 about the pivot pins 168 and 170.

Figure 3:
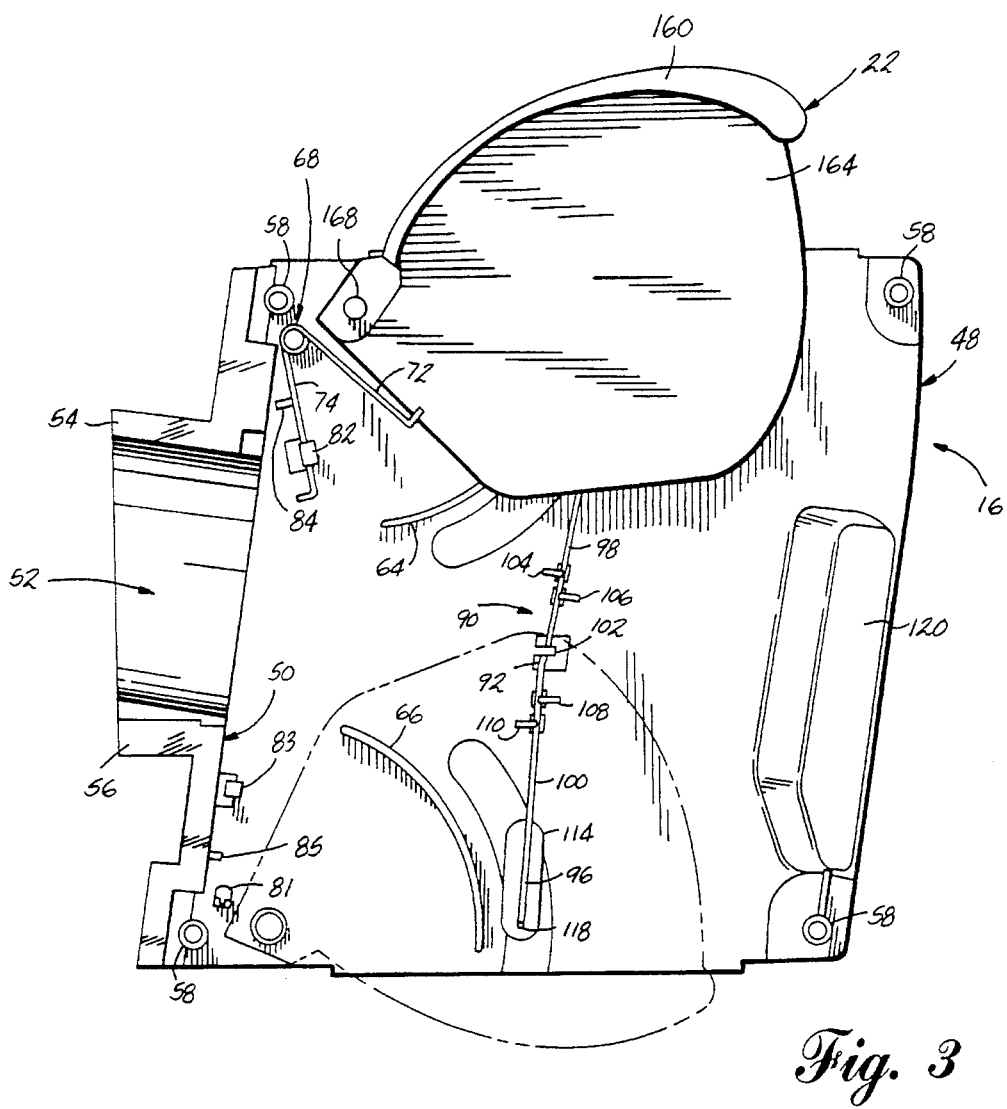
FIG. 3 is a top view of the partially assembled base and arms of the container holder of FIG. 1.

When the arms 22 and 24 are in the stored position, the pawls 116 and 118 of the locking spring 90 are disposed above the top edges 176 and 178 and adjacent the trailing edges 188 and 190 of the ratchets 172 and 174 so that the arms 22 and 24 are biased outwardly by the arm springs 68 and 70. In this position, the pawls 116 and 118 do not engage the detents 180, 182 of the ratchets 172 and 174. When the drawer 14 is in the use position, the arms 22 and 24 are in their most outward position and define the largest opening possible for retaining a cup. The pawls 116 and 118 are disposed near the detents 180 and 182 adjacent the leading edges 184 and 186. If a smaller cup opening is desired, the user can independently or simultaneously pivot one or more of the arms 22 or 24 inwardly so that pawls 116 and 118 of the locking spring 90 engage one of the detents 180 and 182 of the ratchets 172 and 174. The cup receiving area 139 and 141 can be reduced in size by the user by further pivoting the arms 22 and 24 inwardly so that the pawls 116 and 118 engage the next successive detents 180 and 182. As seen in FIG. 3, once the final detent 182 is passed, the pawl 118 follows the outer surface of the ratchet around the end 190 and then along the top edge 178 to the leading edge 186. In this latter position, the arm 24 will be in its outermost position. The other arm 22 works in the same way.

As the drawer 14 is returned to the housing 12, the sidewalls of the housing 28, 30 will force the arms 22, 24 into the their innermost position in which the pawls 116, 118 will be at the trailing edge 188, 190 of the ratchets 172, 174. Thus, when the drawer 14 is pulled out, the arms 22, 24 will spring out to the outermost position for receipt of a cup or similar container. The user can then adjust the arms inwardly independently of each other to adjust the size of the arms 22, 24 to fit the container size.

Figure 6:
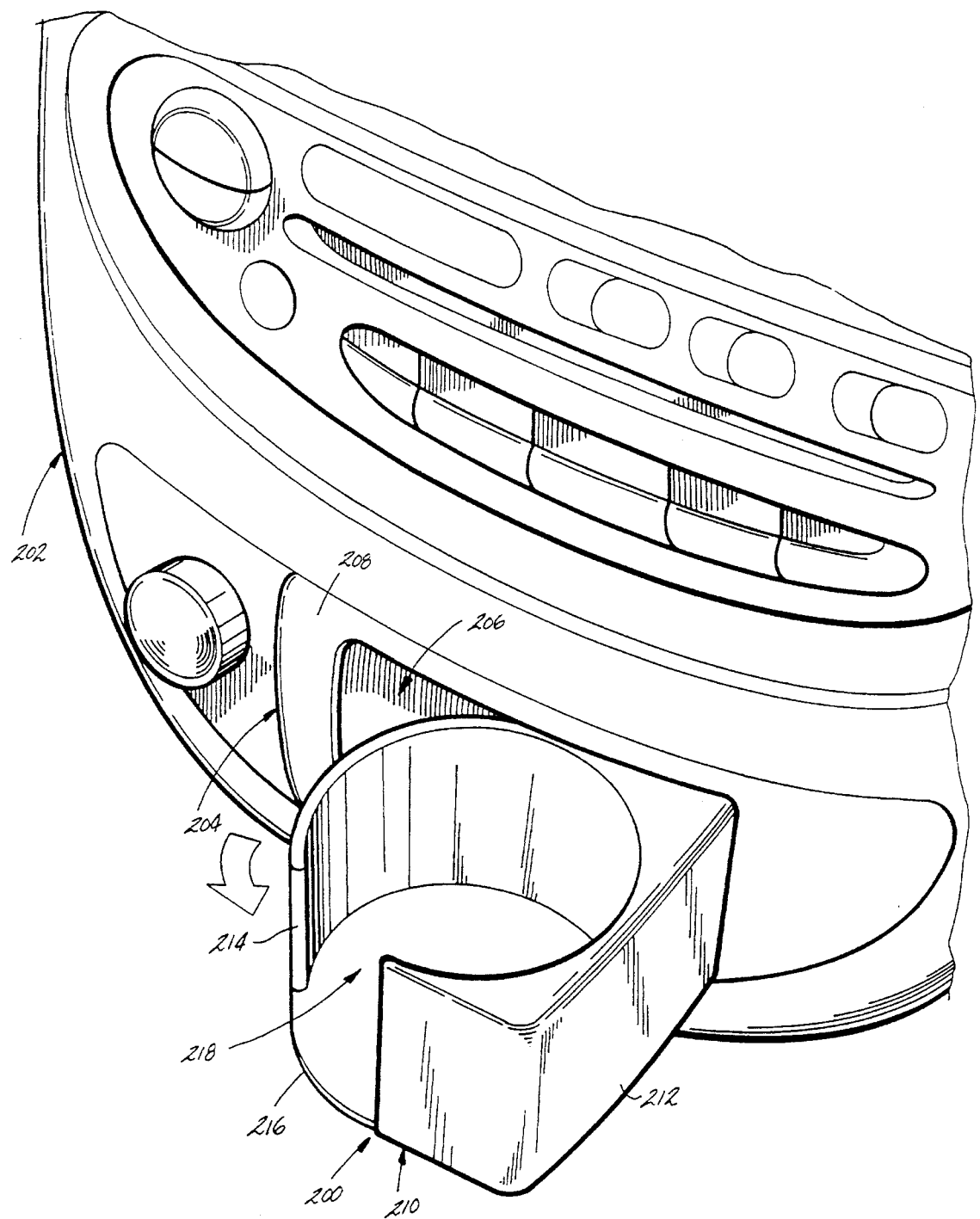
FIG. 6 is a perspective view of a second embodiment of the container holder according to the invention.

FIG. 6 illustrates a second embodiment of a container holder 200 according to the invention. The second embodiment container holder 200 is pivotally mounted within the dashboard or console 202 of an automobile. The console 202 comprises a housing 204 having a slot 206 in which the container holder 200 is pivotally mounted so that the container holder 200 can be pivoted from a stored position where it is disposed within the console 202 to a use position where it is pivoted beyond the exterior of the console 202 as shown in FIG. 6. A decorative trim plate 208 can be mounted to the console 202 to cover the container holder 200.

The container holder 200 comprises a container housing 210 formed by opposing arm members 212 and 214. One of the opposing arms 212 and 214 has mounted thereto or formed therewith a container support 216 for supporting the base of a container. The opposing arms 212, 214 and container support 216 define a container receiving area 218 in which a container is received.

The opposing arms 212, 214 can be pivotally movable with respect to each other to define an adjustable size container receiving area 218. However, it is preferred that the opposing arms 212, 214 are fixed with respect to the other opposing arm 212, 214 so that the container receiving area 218 is fixed in size.

The container housing 210 is preferably discretely adjustable by use of a pawl and ratchet type mechanism similar to the pawl and ratchet mechanism described with respect to the first embodiment. The pawl can be mounted to either of the container housing 210 or the console housing 204. Likewise, the ratchet is mounted to the other of the container housing 210 or the console housing 204. Container housing 210 is discretely movable with respect to the console housing 204 to vary the usable size of the container receiving area 218.

Preferably, the container housing 210 is lockable within the slot 206 of the console housing 204 and is biased outwardly from the console housing 204 in a manner similar to the first embodiment. Thus, as the container housing 210 is unlocked, it is biased outwardly of the console housing 204 from the stored position to the use position. The locking mechanism is preferably of the type that is unlocked by the inward movement of the container housing 204.

Figure 7:
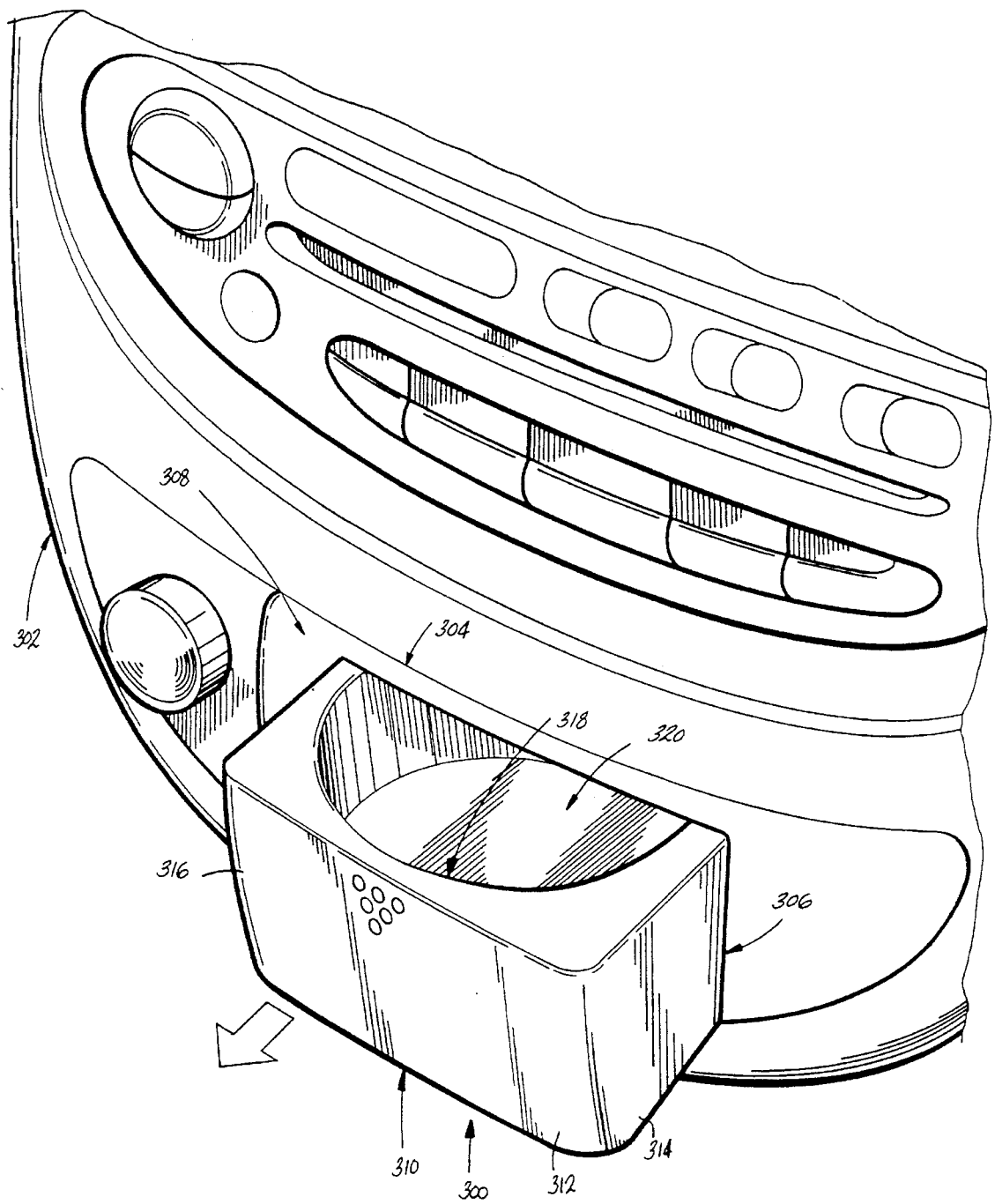
FIG. 7 is a perspective view of a third embodiment of the container holder according to the invention.

FIG. 7 illustrates a third embodiment of a container holder 300 according to the invention. The container holder 300 is slidably mounted within the dashboard or console 302 of an automobile. The console 302 comprises a console housing 304 having a slot 306 in which the container holder 300 is slidably mounted so that the container holder 300 can be moved from a stored position where it is disposed within the console 302 to a use position where it is moved beyond the exterior of the console 302 as is shown in FIG. 7. A decorative trim plate 308 can be mounted to the console 302 to cover the container holder 300.

The container holder 300 comprises a container housing 310 having a front wall 312 and opposing sidewalls 314, 316 in which is formed an arcuate recess 318 that defines a cup receiving area 320.

Preferably, the container holder 300 is discretely slidable with respect to the console 302 by use of a pawl and ratchet type mechanism similar to the pawl and ratchet mechanism described with respect to the first or second embodiment. The pawl can be mounted to either the container housing 310 or console housing 304. Likewise, the ratchet is mounted to the other of the housing 310 or console housing 304 so that the container housing 310 is discretely movable with respect to the console housing 304 to vary the usable size of the container receiving area 320.

Preferably, the container housing 310 is lockable within the slot 306 of the console housing 304 and is biased outwardly from the console housing 304 in a manner similar to the first and second embodiment. Thus, as the container housing 310 is unlocked, it is biased outwardly of the console housing 304 from the stored position to the use position.

Whereas the invention has been described with respect to a pair of cup holders comprising movable arms and a recess in a drawer which is slidably mounted in a housing, the invention is also applicable to container holders which are not mounted to slidable drawers. For example, a container holder within the scope of the invention can comprise one or more arms pivotably mounted in a housing for movement into a slot in the housing and outside of the housing. A pawl and ratchet detents can be used between the housing and the arms to define the position of the container holder with respect to the arms. The pawl and ratchet can be identical or similar to the pawl and ratchet detents described in the application.

Referring now to FIG. 8, there is shown the underside of a container platform 166a which is mounted on a pivot pin 170a and has ratchet mechanism 174a to control the position of the arm 24a with respect to the drawer 14a. The ratchet mechanism 174a comprises a raised projection having a top edge 178a on one side and a plurality of teeth 182a at another edge. The ratchet 174a further has a leading edge 186a and a trailing edge 190a. The ratchet 174a operates in all other respects identical to the ratchet 174 illustrated in FIG. 4.

While particular embodiments of the invention have been shown, it will be understood that the invention is not limited thereto since modifications may be made by those skilled in the art, particularly in light of the foregoing teachings. For example, a pin or teeth or intermeshed gears can be used to adjust the position of the arms with respect to the drawer instead of the pawl and ratchet. Also, any other suitable biasing device such as a resilient band or any other mechanical device such as a lever can be used to bias the arms away from the drawer. Further, the arms could be constructed to move lateral with respect to the drawer rather than pivot. Reasonable variation and modification are possible within the scope of the foregoing disclosure of the invention without departing from the spirit of the invention.

The embodiments of the invention in which an exclusive property or privilege is claimed are defined as follows:

1. A container holder for supporting a container and comprising:

a housing having a back and a front;

a drawer slidably mounted within the housing and having a recess, the drawer is slidable between a stored position where the recess is disposed within the housing and a use position where the recess extends beyond the front of the housing;

an arm mounted to the drawer in complementary relationship with the recess for movement between a retracted position within the recess to an outermost position so that the recess and the arm define a container receiving area of varying size;

a biasing member to bias the arm outwardly of the drawer;

a first positioning member mounted to one of the arm and drawer; and a second positioning member mounted to the other of the arm and drawer and releasably engagable with the first positioning member to releasably retain the arm in a plurality of adjusted positions with respect to the recess so that the container receiving area can be releasably set in different sizes to accommodate different size containers.

2. A container holder according to claim 1 and further comprising a second recess and a second arm movably mounted to the drawer in complementary relationship to the second recess so that the second recess and the second arm define a second container receiving area of varying size.

3. A container holder according to claim 2 wherein the housing further comprises opposed sidewalls, each sidewall having a groove, and the drawer has opposed sidewalls each having a rail, the rails of the drawer slidably mount in the grooves of the housing.

4. A container holder according to claim 1 wherein the first positioning member is a pin and the second positioning member comprises multiple teeth between which the pin is received to discretely adjust the position of the arm.

5. A container holder according to claim 1 wherein the first positioning member is a pawl and the second positioning member is a ratchet having multiple detents in which the pawl is received to discretely adjust the position of the arm.

6. A container holder according to claim 1 wherein the arm has a pivot pin and is pivotally mounted to the drawer through the pivot pin for rotation about a vertical axis.

7. A container holder according to claim 6 wherein the arm further comprises a container platform for supporting the base of a container received within the container receiving area.

8. A container holder according to claim 7 wherein the biasing member is a spring comprising a first and second arm, the first spring arm is mounted to the drawer and the second spring arm is mounted to the arm.

9. A container holder according to claim 1 wherein the arm is arcuate in shape to define a portion of the container receiving area.

10. A container holder according to claim 1 wherein the arm further comprises a container platform for supporting the base of a container received within the container receiving area.

11. A container holder according to claim 1 wherein the biasing member is a spring comprising a first and second arm, the first spring arm is mounted to the drawer and the second spring arm is mounted to the arm.

12. A container holder according to claim 1 and further comprising a release for the first and second position members to permit movement of the arm from the retracted position to the outermost position without interference between the first and second positioning members, whereby the arm can move unimpeded to the outermost position from the retracted position.

13. A container holder according to claim 12 wherein the housing has a sidewall which interfaces with the arm to move the arm to the retracted position when the drawer is in the stored position, whereby the arm will automatically move to the outermost position when the drawer is moved to the use position.

14. A container holder according to claim 1 wherein the drawer has a plurality of pockets for receiving coins.

15. A container holder for supporting a container and comprising:

a housing having a slot; and an adjustable retainer movably mounted to the housing within the slot from a stored position within the housing to a use position wherein the retainer extends beyond the front of the housing, the adjustable retainer defining a container receiving area of varying size and which is discretely adjustable to a plurality of adjusted positions between a retracted position and a fully extended position so that the size of the container receiving area is adjustable to accommodate containers of varying size when the retainer is in the use position; and a release to releasably retain the adjustable retainer in the plurality of adjusted positions so that the container receiving area can be releasably set in different sizes, the release further selectively permitting the free movement of the adjustable retainer from the retracted position to the fully extended position when the retainer is in the use position.

16. A container holder for supporting a container and comprising:

a support having a vertical wall defining a recess;

an arm pivotably mounted to the support in complementary relationship with the recess defining wall for movement between a retracted position adjacent the recess and an extended position remote from the recess, the recess defining wall and the arm defining a container-receiving area of varying size;

a biasing member mounted between the arm and the support to bias the arm outwardly with respect to the support;

a detent mechanism mounted to the arm and the support for selectively retaining the arm in at least one adjusted position with respect to the support between the retracted and extended positions as the arm moves from the extended position to the retracted position but permits the arm to move freely from the retracted position to the extended position without being retained at said at least one adjusted position whereby the container-receiving area can be releasably set in different sizes to accommodate different size containers.

17. A container holder according to claim 16 wherein the detent mechanism comprises a pin mounted to one of the arm and support and a retainer mounted to the other of the arm and the support, the retainer having a first surface with at least one detent in which the pin is received to releasably retain the arm in the at least one adjusted position.

18. A container holder according to claim 17 wherein the retainer further comprises a second surface spaced laterally from the first surface for guiding the pin in a substantially parallel path to the first surface whereby the arm is free to move unimpeded between the retracted and extended positions when the pin follows the second surface.

19. A container holder according to claim 18 wherein the retainer further has a leading edge connecting the first and second surfaces at one end and a trailing end joining the first and second surfaces at another end; and the detent mechanism further comprises a spring biasing the pin into contact with the second surface when the arm moves from the retracted position to the extended position and biases the pin into contact with the first surface when the arm moves from the extended position to the retracted position.

20. A container holder according to claim 19 wherein the first surface is shaped so that the pin moves from the first surface to the second surface around the leading edge as the arm moves to the retracted position.

21. A container holder according to claim 20 wherein the second surface is shaped so that the pin moves from the second surface to the first surface around the trailing edge as the arm moves to the extended position.

22. A container holder according to claim 21 wherein the retainer has a plurality of detents for releasably receiving the pin and for thus releasably retaining the arm in a plurality of adjusted positions with respect to the support.

23. A container holder according to claim 17 wherein the first surface of the retainer has multiple detents in which the pin may be received to releasably retain the arm in multiple adjusted positions with respect to the support.

24. A container holder according to claim 16 wherein the arm is arcuate in shape to define a portion of the container-receiving area.

25. A container holder according to claim 16 wherein the detent mechanism has a plurality of detents for releasably retaining the arm in a plurality of adjusted positions as the arm moves from the extended position to the retracted position.

* * * * *